US 12,433,196 B1
Oct. 7, 2025

(12) United States Patent
Mori et al.

(54) PRODUCE HARVESTING DEVICE

(71) Applicant: Tokuiten Inc., Nagoya (JP)

(72) Inventors: Hiroki Mori, Nagoya (JP); Shota Nonoyama, Nagoya (JP); Ryusuke Nishikawa, Nagoya (JP); Fumio Okuno, Nagoya (JP)

(73) Assignee: Tokuiten Inc.

( * ) Notice: Subject to any disclaimer, the term of this patent is extended or adjusted under 35 U.S.C. 154(b) by 0 days.

(21) Appl. No.: 19/170,075

(22) Filed: Apr. 4, 2025

(30) Foreign Application Priority Data

Apr. 5, 2024 (JP) ................................. 2024-061181

(51) Int. Cl.
 *A01D 46/30* (2006.01)
 *B25J 9/16* (2006.01)
 *B25J 15/00* (2006.01)

(52) U.S. Cl.
 CPC ............ *A01D 46/30* (2013.01); *B25J 9/1664* (2013.01); *B25J 9/1697* (2013.01); *B25J 15/0019* (2013.01)

(58) Field of Classification Search
 CPC ...... A01D 45/00; A01D 46/005; A01D 46/28; A01D 46/30; A01D 46/253; B25J 9/1664;
 (Continued)

(56) References Cited

U.S. PATENT DOCUMENTS

| 2,650,464 A * | 9/1953 | Bernheim ............ A01D 46/247 53/391 |
| 3,460,330 A * | 8/1969 | Black, Jr. ............ A01D 46/005 56/328.1 |

(Continued)

FOREIGN PATENT DOCUMENTS

| CN | 112154784 A | 1/2021 |
| CN | 112772145 A | 5/2021 |

(Continued)

OTHER PUBLICATIONS

Development and evaluation of a robust soft robotic gripper for apple harvesting, Computers and Electronics in Agriculture, by Xing Wang, Hanwen Kang, Hongyu Zhou, Wesley Au, Michael Yu Wang, Chao Chen, (Dec. 14, 2022, vol. 204, pp. 107552.1-107552.12, dated Nov. 10, 2022).

(Continued)

*Primary Examiner* — Joseph M Rocca
*Assistant Examiner* — Robert E Pezzuto
(74) *Attorney, Agent, or Firm* — Best Mode IP Law, PLLC; Yusuke Hirai

(57) ABSTRACT

A produce harvesting device includes a cylindrical member; a rotating member that forms a through-hole member; and a rotation driving unit that drives the rotating member to rotate about a virtual axis. The rotating member is configured to: when the rotating member comes into contact with the fruit or vegetable while rotating, twist the fruit or vegetable relative to a stem of the fruit or vegetable; when the rotating member comes into contact with the fruit or vegetable moving toward the rear side, deform toward the rear side to increase the through-hole member in size; and reduce the through-hole member in size by returning back to an original shape of the rotating member.

12 Claims, 10 Drawing Sheets

(58) Field of Classification Search
CPC ........ B25J 9/02; B25J 9/1697; B25J 15/0019;
B25J 15/0226; B25J 15/0658
See application file for complete search history.

(56) References Cited

U.S. PATENT DOCUMENTS

| | | | | |
|---|---|---|---|---|
| 3,538,695 | A | * 11/1970 | Carnell | ................ A01D 46/005 |
| | | | | 56/332 |
| 2020/0288636 | A1 | 9/2020 | Kent et al. | |
| 2021/0323174 | A1* | 10/2021 | Salisbury | ................ A01D 46/30 |
| 2022/0078972 | A1* | 3/2022 | Faulring | .............. B25J 15/0226 |

FOREIGN PATENT DOCUMENTS

| | | |
|---|---|---|
| JP | 2010-207118 A | 9/2010 |
| JP | 2021-036821 A | 3/2021 |
| JP | 7468962 B1 | 4/2024 |

OTHER PUBLICATIONS

Towards an Efficient Tomato Harvesting Robot: 3D Perception, Manipulation, and End-Effector (IEEE Access, 17631-17640 page, dated Jan. 18, 2021, vol. 9, 2021, published on Feb. 1, 2021).

* cited by examiner

PRODUCE HARVESTING DEVICE

CROSS REFERENCE TO RELATED APPLICATION

This application is based on, and claims the benefit of priority from Japanese Patent Application No. 2024-061181 on Apr. 5, 2024. The entire disclosure of the above application is incorporated herein by reference.

TECHNICAL FIELD

The present disclosure relates to a produce harvesting device used to harvest a fruit or vegetable (i.e., produce).

BACKGROUND

Harvesting of various fruits and vegetables, such as tomatoes, is still manually operated. Therefore, it is desirable to present a useful technique for improving the harvesting efficiency of fruits and vegetables.

For example, a produce harvesting end effector described in Patent Literature 1 (JP 2010-207288 A) has a U-shaped metal fitting and a stalk holder. The end effector takes in a fruit or vegetable by the metal fitting and hooks and tears off the stalk of the fruit or vegetable using the metal fitting while holding the stalk with the stalk holder. Further, a harvesting robot described in Patent Literature 2 (JP 2021-036821 A) includes a harvesting ring and plucks a fruit or vegetable by twisting and pulling the harvesting ring during the process of pushing up the harvesting ring along the side surface of the fruit or vegetable.

SUMMARY

However, when a fruit and vegetable is picked by bringing a member such as a metal fitting or ring into contact with the fruit and vegetable as described in Patent Literatures 1 and 2, it is difficult to improve harvesting efficiency. Furthermore, when a fruit or vegetable is picked using a metal fitting or ring, the fruit or vegetable is likely to be damaged or deformed.

In view of the above, the inventors of the present disclosure considered that by harvesting fruits or vegetables using a suction force of air, harvesting efficiency would be improved and damages to the fruits or vegetables would be avoided. However, after repeated trials and errors, the inventors in the present disclosure also found that when the suction force of air was low, the fruits or vegetables could not be properly sucked in, which reduced the accuracy of harvesting. On the contrary, if the suction force of air was high, although the harvesting efficiency improved, the fruits or vegetables were damaged or deformed when the fruits or vegetables came into contact with an object in the suction passage. Since fruits and vegetables vary in shape, size, hardness, etc., it is difficult to determine an appropriate suction force. Furthermore, when plucking a fruit or vegetable from the stalk (hereinafter, may be called as an axis, stalk, branch, or stem) that supports the fruit or vegetable, the fruit or vegetable may need to be twisted appropriately relative to the stem in order to properly plucking the fruit or vegetable from the stem. Therefore, there has been a demand for a technology that can efficiently harvest multiple fruits and vegetables, which have differences in shape, size, and hardness, while preventing damage, deformation, or the like to the fruits and vegetables.

A typical objective of the present disclosure is to provide a produce harvesting device that is capable of efficiently harvesting a plurality of types of fruits or vegetables while avoiding an occurrence of damage, deformation, and the like, to the fruits or vegetables.

In one aspect of the present disclosure, a produce harvesting device includes: a cylindrical member that defines a guide passage therein through which a fruit or vegetable passes toward a rear side, the cylindrical member guiding the fruit or vegetable toward a hose that is connected to the cylindrical member and defines a suction passage therein for air that is in communication with the guide passage; a rotating member that radially extends from an inner circumferential surface or a front side of the cylindrical member into the guide passage and forms a through-hole member that allows the fruit or vegetable to pass through from the front side to the rear side; and a rotation driving unit that is configured to drive the rotating member to rotate about a virtual axis that extends in a direction along the guide passage. The rotating member is configured to: when the rotating member comes into contact with the fruit or vegetable while rotating, twist the fruit or vegetable relative to a stem of the fruit or vegetable; when the rotating member comes into contact with the fruit or vegetable moving toward the rear side, deform toward the rear side to increase the through-hole member in size when the rotating member is viewed in a direction along the virtual axis; and reduce the through-hole member in size by returning back to an original shape of the rotating member.

According to the produce harvesting device in the present disclosure, multiple types of fruits and vegetables can be harvested efficiently while minimizing occurrence of damage, deformation, and the like, to the fruits and vegetables.

DETAILED DESCRIPTION

Overview

Figure 1:
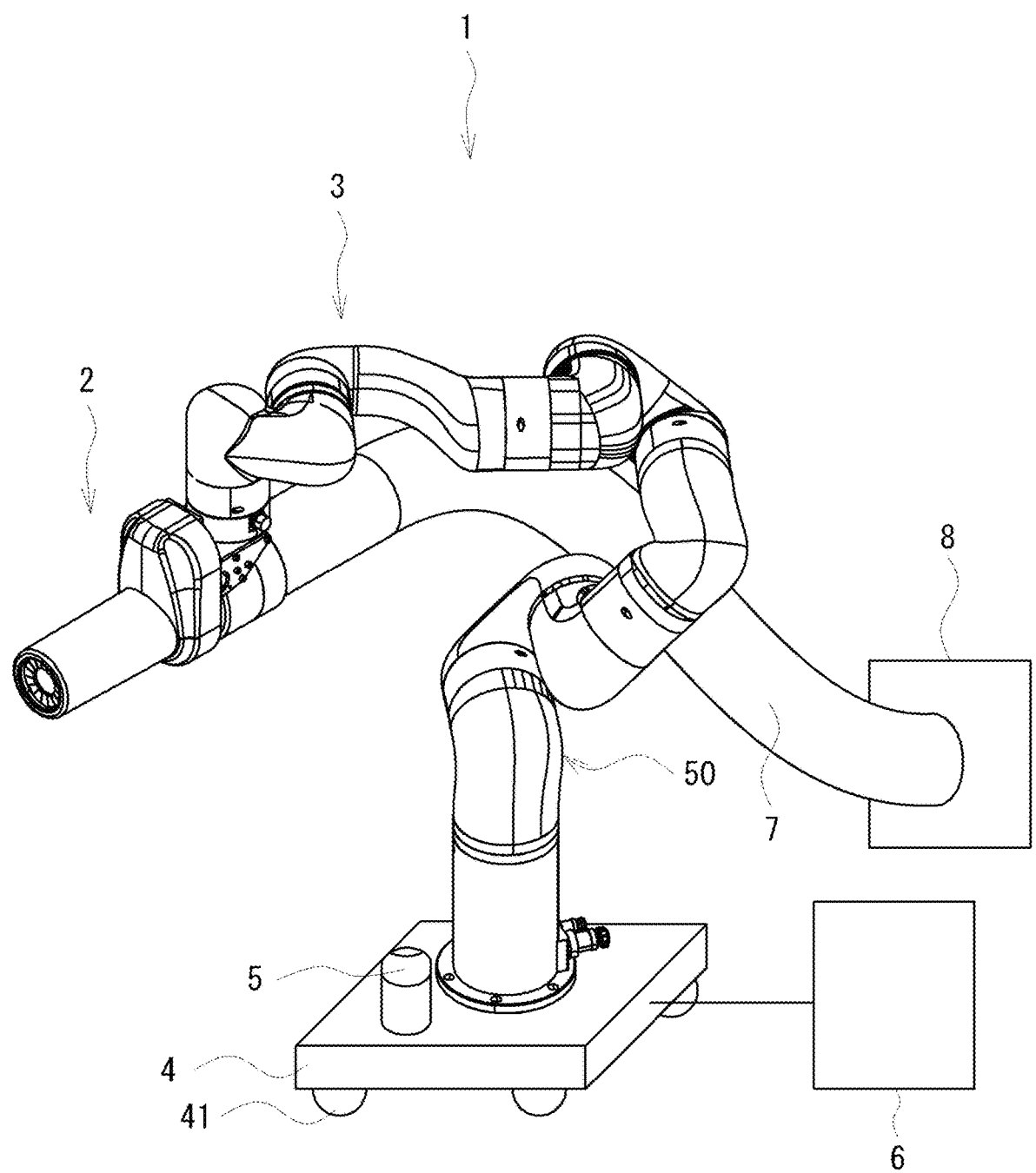
FIG. 1 is a perspective view of a produce harvesting device 1 when viewed diagonally from a right-upper side.

A produce harvesting device exemplified in this disclosure includes a cylindrical member, a rotating member, and a rotation driving unit. The cylinder member has a cylindrical shape. A guide passage is defined by the cylindrical member to allow a fruit or vegetable to pass toward a rear side. The guide passage of the cylindrical member is connected to the hose, which serves as a suction passage for air, so that the cylindrical member guides the fruit or vegetable that has passed through the guide passage to the hose. The rotating member extends from an inner circumferential surface or a front side of the cylindrical member toward the inside of the guide passage. A through-hole member is formed inside the rotating member, allowing the fruit and vegetable to pass from a tip side (the front side) to a rear end side (the rear side). A rotation driving unit is configured to drive the rotating member to rotate about a virtual axis that extends in a direction along the guide passage. When the rotating member comes into contact with the fruit or vegetable while rotating, the rotating member twists the fruit or vegetable supported by a stem relative to the stem. When the rotating member comes into contact with the fruit or vegetable moving toward the rear side, the rotating member deforms toward the rear side, thereby increasing an area of the through-hole member (i.e., the area of the through-hole member when the rotating member is viewed in the direction along the virtual axis). The rotating member restores the shape, thereby reducing the area of the through-hole member.

According to the produce harvesting device in the present disclosure, when a fruit or vegetable (i.e., produce) does not come into contact with the rotating member, the through-hole member formed in the rotating member is in a downsized state, and therefore the suction pressure of air in the rotating member is high as compared to the state where the area of the through-hole member is enlarged. Therefore, a high suction pressure is applied to the fruit or vegetable towards the rear side. Accordingly, for example, when the fruit or vegetable has a size to pass through the reduced-size through-hole member, the fruit or vegetable may be plucked directly from its stem by the high suction pressure, pass through the through-hole member to the rear side, and be guided into the hose. Furthermore, when a fruit or vegetable comes into contact with the rotating member which is rotating, the fruit or vegetable is twisted relative to the stem due to a frictional force generated between the rotating member and the fruit or vegetable. As a result, the fruit or vegetable is easier to pluck from the stem than if the fruit or vegetable was not twisted relative to the stem. Furthermore, when a fruit or vegetable comes into contact with the rotating member, the rotating member temporarily deforms toward the rear side, expanding the area of the through-hole member, so that the fruit or vegetable passes smoothly through the through-hole member toward the rear side. After the fruit or vegetable has passed through the through-hole member, the through-hole member is reduced in size by the restoring force of the rotating member, so that the suction pressure at the through-hole member increases again. Therefore, the produce harvesting device in the present disclosure can efficiently harvest multiple fruits or vegetables while preventing the fruits or vegetables from getting damaged, deformed, and the like.

The configuration of the rotating member can be selected appropriately. For example, the rotating member may be attached to the cylindrical member. The rotation driving unit may rotate the cylindrical member about a virtual axis to rotate the rotating member provided on the cylindrical member. Moreover, the rotating member may be provided separately from the cylindrical member. In this case, the rotation driving unit may rotate the rotating member separately from the cylindrical member, or may rotate the cylindrical member and the rotating member together.

The rotating member may be made of at least one of silicone and rubber, which have flexibility and shape restoring characteristics. In this case, even if the fruit or vegetable comes into contact with the rotating member, the fruit or vegetable is less likely to be damaged or deformed. In addition, when a fruit or vegetable comes into contact with the rotating member while rotating, the frictional force generated between the rotating member and the fruit or vegetable causes the fruit or vegetable to be appropriately twisted relative to the stem, making it easier to pluck the fruit or vegetable from the stem. Furthermore, when the fruit or vegetable is separated from the rotating member, the shape of the rotating member is properly restored, and the area of the through-hole member is reduced again. Accordingly, the fruits or vegetables can be harvested appropriately.

However, the rotating member may be made of material other than silicon or rubber to have deformability and shape recovery properties. For example, the rotating member may be made of urethane or the like.

The rotating member may have three or more cuts each extending radially outward from the center, thereby forming at least a portion of the through-hole member. The inner ends of the three or more cuts may be connected to a single connecting point or to a single through hole that passes through the rotating member from the front side to the rear side. In this case, a plurality of movable pieces that are movable (i.e., deformable) in a front-rear direction are formed around the connecting point or the through hole in the rotating member. Therefore, when a fruit or vegetable comes into contact with the movable pieces of the rotating member, the fruit or vegetable is twisted relative to the stem and the movable pieces deforms toward the rear side, allowing the fruit or vegetable to pass through appropriately toward the rear side. Furthermore, when the fruit or vegetable is separated from the movable pieces, the shape of each movable piece is properly restored and the size of the through-hole member is reduced again. Accordingly, the fruits or vegetables can be harvested appropriately.

The multiple cuts provided in the rotating member may be linear or curved. Furthermore, the rotating member may be configured so that, when the through-hole member is reduced in size, the through hole passing through the rotating member in the front-rear direction is closed. In this case, the inner ends of the three or more cuts may be connected to the single connecting point. Further, the through hole may be a hole that passes through the rotating member in the front-rear direction even when the through-hole member is reduced to a minimum size.

When the rotating member is viewed in a direction along the virtual axis, the connecting point to which the inner ends of the three or more cuts are connected may be spaced away (or offset) from the virtual axis. Alternatively, when the rotating member is viewed in the direction along the virtual axis, the center of gravity of the through hole may be spaced apart (or offset) from the virtual axis. In this case, a fruit or vegetable that approaches a portion of the rotating member near the virtual axis easily comes into contact with the rotating member. In addition, since the rotating member is rotated by the rotation driving unit, a fruit or vegetable that approaches a portion of the rotating member away from the virtual axis is also more likely to come into contact with the rotating member. As a result, the fruit or vegetable is likely to be twisted about the stem. Accordingly, the fruits or vegetables can be harvested appropriately. In addition, when a through hole is provided in the rotating member, the center of gravity of the through hole indicates the center of gravity when the through-hole member is reduced (shrunk).

However, when the rotating member is viewed in a direction along the virtual axis, the connecting point to which the inner ends of the three or more cuts are connected may match (or be aligned with) the virtual axis. Alternatively, when the rotating member is viewed in the direction along the virtual axis, the center of gravity of the through hole may match (or be aligned with) the virtual axis. In this case, when the control unit of the produce harvesting device may control the robot arm (which will be described later) to move the rotating member to the position of the fruit or vegetable, the control unit may move a specified position of the rotating member that is away from the virtual axis to the position of the fruit or vegetable. In other words, the control unit may move the rotating member to a position such that the virtual axis of the rotating member is offset from the fruit or vegetable. In this case, the fruit or vegetable will be likely to come into contact with the rotating member, and thus the fruit or vegetable will be likely to be twisted relative to its stem.

The inner ends of the three or more cuts in the rotating member may be connected to the through hole. When the rotating member is viewed in the direction along the virtual axis, the through hole may be formed in an elliptical or polygonal shape. In this case, the force applied to a fruit or vegetable from the rotating member is more likely to change than when the through hole when viewed in the direction along the virtual axis has a circular shape. As a result, the fruit or vegetable is more easily twisted about the stem. Accordingly, the fruits or vegetables can be harvested appropriately. However, the through hole may also be circular in shape.

The produce harvesting device may further include a cover member that circumferentially surrounds and covers the rotating member. In this case, branches, leaves, etc. are less likely to come into contact with the rotating member (the rotating cylindrical member in the embodiment described below). This reduces the possibility of unnecessarily damaging branches, leaves, etc., and the possibility of moving the target fruit or vegetable.

The produce harvesting device may further include a hose and a speed reducer. As previously described, the hose is connected to the guide passage in the cylindrical member. The speed reducer is disposed inside the hose without blocking or closing the path in the hose. The speed reducer comes into contact with the fruit or vegetable passing through the hose, thereby reducing the passing speed of the fruit or vegetable through the hose. In this case, the speed at which the fruit or vegetable passes through the hose is reduced by the speed reducer, so that the possibility of damage, deformation, etc. occurring to the fruit or vegetable passing through the hose can be appropriately reduced. Furthermore, since the speed reducer does not block the guide passage within the hose, the speed reducer also prevents the suction pressure of air in the cylindrical member from being reduced. Accordingly, the fruits or vegetables can be harvested appropriately.

A suction pressure generator for generating a suction pressure of air may be disposed in the hose at a position different from the end portion of the hose that is connected to the cylindrical member. In this case, the fruits and vegetables are properly harvested by the suction pressure generated by the suction pressure generator.

The speed reducer may be made of flexible material (for example, at least one of silicon, rubber, urethane, etc.). In this case, even if the fruit or vegetable comes into contact with the speed reducer, the fruit or vegetable is less likely to be damaged or deformed. Furthermore, the specific structure and number of the speed reducers can be appropriately selected. For example, the speed reducer may have a substantially annular shape extending inward from the inner circumferential surface of the hose. A through hole may be defined by the speed reducer. A plurality of movable pieces may be circumferentially arranged around the through hole in the speed reducer. Furthermore, a space may be formed between the adjacent movable pieces. In this case, although the speed reducer is provided, the suction pressure is less likely to increase. Therefore, the speed reducer can reduce the passing speed of the fruits or vegetables by the movable pieces while preventing the passing speed of the fruits or vegetables from increasing due to the suction pressure. Further, the speed reducer may be a fabric or the like that is disposed in the inside of the hose. In this case, the speed of the fruits and vegetables can be appropriately reduced with a simple structure.

The specific method for providing the speed reducer in the hose may also be selected as appropriate. For example, a plurality of speed reduces may be disposed at connecting portions between a plurality of hoses. In this case, the plurality of speed reducers can be easily and appropriately disposed at the connecting portions between the plurality of hoses.

The produce harvesting device may further include a robot arm, an imaging unit, and a control unit. The robot arm includes an arm member. The robot arm holds a harvesting mechanism by the arm member. The harvesting mechanism includes at least the cylindrical member, and the rotating member. The robot arm moves the harvesting mechanism held by the arm member by driving the arm member. The imaging unit captures images. The control unit may recognize the position of the target fruit or vegetable based on the image captured by the imaging unit, and move the harvesting mechanism to the position of the recognized target fruit and vegetable by controlling the robot arm based on the recognized position of the target fruit and vegetable. Therefore, even if the worker does not move the position of the harvesting mechanism himself/herself, the harvesting mechanism automatically moves to the position of the target fruit or vegetable. Therefore, fruits and vegetables can be harvested while avoiding in increasing the burden on the worker.

The location where the imaging unit is installed is not particularly limited as long as the target fruits or vegetables can be captured by the imaging unit. For example, the imaging unit may be installed near the position where the robot arm is held, or may be installed near the harvesting mechanism.

The imaging unit may include a three-dimensional camera capable of measuring the distance to an object. In this case, the control unit can easily and appropriately recognize the position of the target fruit and vegetable based on the distance measured by the three-dimensional camera. Accordingly, the fruits or vegetables can be harvested appropriately.

The imaging unit may be capable of capturing color images. Based on the color images captured by the imaging unit, the control unit may identify the target fruit or vegetable from among one or more fruits or vegetables in the color image. In this case, even if a plurality of fruits or vegetables are captured in a color image, the target fruit or vegetable can be appropriately identified based on the color image. Accordingly, the fruits or vegetables can be harvested appropriately. However, it is also possible to identify the target fruit or vegetable based on monochrome images or the like.

A specific method for identifying the target fruit or vegetable based on the images can be selected as appropriate. For example, a mathematical model trained by a machine learning algorithm may be used to output the identified target fruit or vegetable by inputting the image into the mathematical model. The control unit may acquire the identified result output by the mathematical model by inputting the image captured by the imaging unit into the mathematical model. In this case, the target fruit or vegetable can be identified with higher accuracy.

In the present disclosure, the robot arm moves the harvesting mechanism to a position around the fruit or vegetable. However, the configuration for moving the harvesting mechanism can also be changed. For example, a worker himself may move the harvesting mechanism to a position close to the fruit or vegetable. In other words, the harvesting mechanism and the like excluding the robot arm may be used as a produce harvesting device. Even in this case, the fruits or vegetables can be properly harvested using the harvesting mechanism described in the present disclosure.

In addition, other configurations may be added to the harvesting mechanism exemplified in this disclosure to harvest fruits or vegetables. For example, a structure (such as a cutter) for plucking fruits or vegetables from the branches may be disposed near the rotating member. In this case, even fruits and vegetables that are difficult to pluck from the branches can be more easily harvested properly using the cutter.

Embodiment

General Configuration

Hereinafter, a typical embodiment of the present disclosure will be described with reference to the drawings. With reference to FIG. 1, an example of the configuration of a produce harvesting device 1 according to the present embodiment will be schematically described. As an example, the produce harvesting device 1 in the present embodiment is used to harvest a plurality of tomatoes (e.g., cherry tomatoes, etc.) as produce. However, at least a portion of the techniques illustrated in this disclosure may also be applied to produce harvesting devices that harvest produce (such as fruits, crops, vegetables, and other agricultural products) other than tomatoes.

As shown in FIG. 1, the produce harvesting device 1 in the present embodiment includes a harvesting mechanism 2, a robot arm 3, a base 4, an imaging unit 5, a control unit 6, a hose 7, and a suction pressure generator 8. When the harvesting mechanism 2 is brought close to a target fruit or vegetable, the harvesting mechanism 2 plucks (tears) the fruit or vegetable from its stem, takes it into an internal passage, and guides it to the hose 7. The robot arm 3 holds and moves the harvesting mechanism 2. The base 4 supports the robot arm 3. The imaging unit 5 captures images. As an example, in this embodiment, the imaging unit 5 is disposed at a predetermined position on the base 4. However, the position of the imaging unit 5 can be changed as appropriate. For example, the imaging unit 5 may be disposed on a base portion 9 of the harvesting mechanism 2 as described later. The control unit 6 controls the produce harvesting device 1. The hose 7 serves as a path for moving fruits or vegetables introduced from the harvesting mechanism 2 to a harvest accumulation location. The suction pressure generator 8 is connected to the hose 7 and generates a suction pressure in the hose 7 by making the air pressure within the hose 7 negative. In other words, the hose 7 also functions as a suction path through which air is sucked by the suction pressure generator 8. The details of each element will be described below.

Harvesting Mechanism

Figure 2:
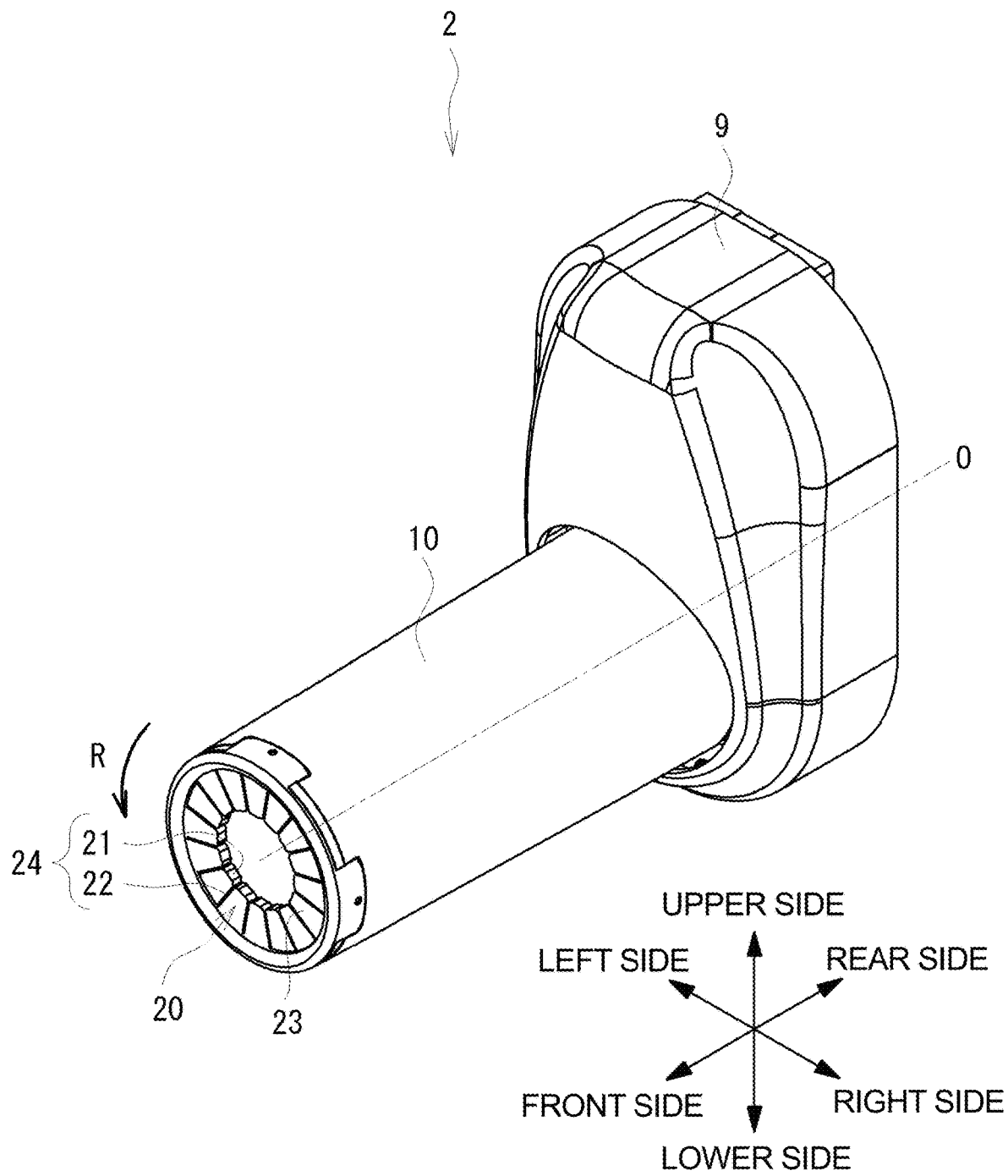
FIG. 2 is a perspective view of a harvesting mechanism 2 with a cover member (see FIG. 4) removed when viewed from diagonally above on a right side.
Figure 3:
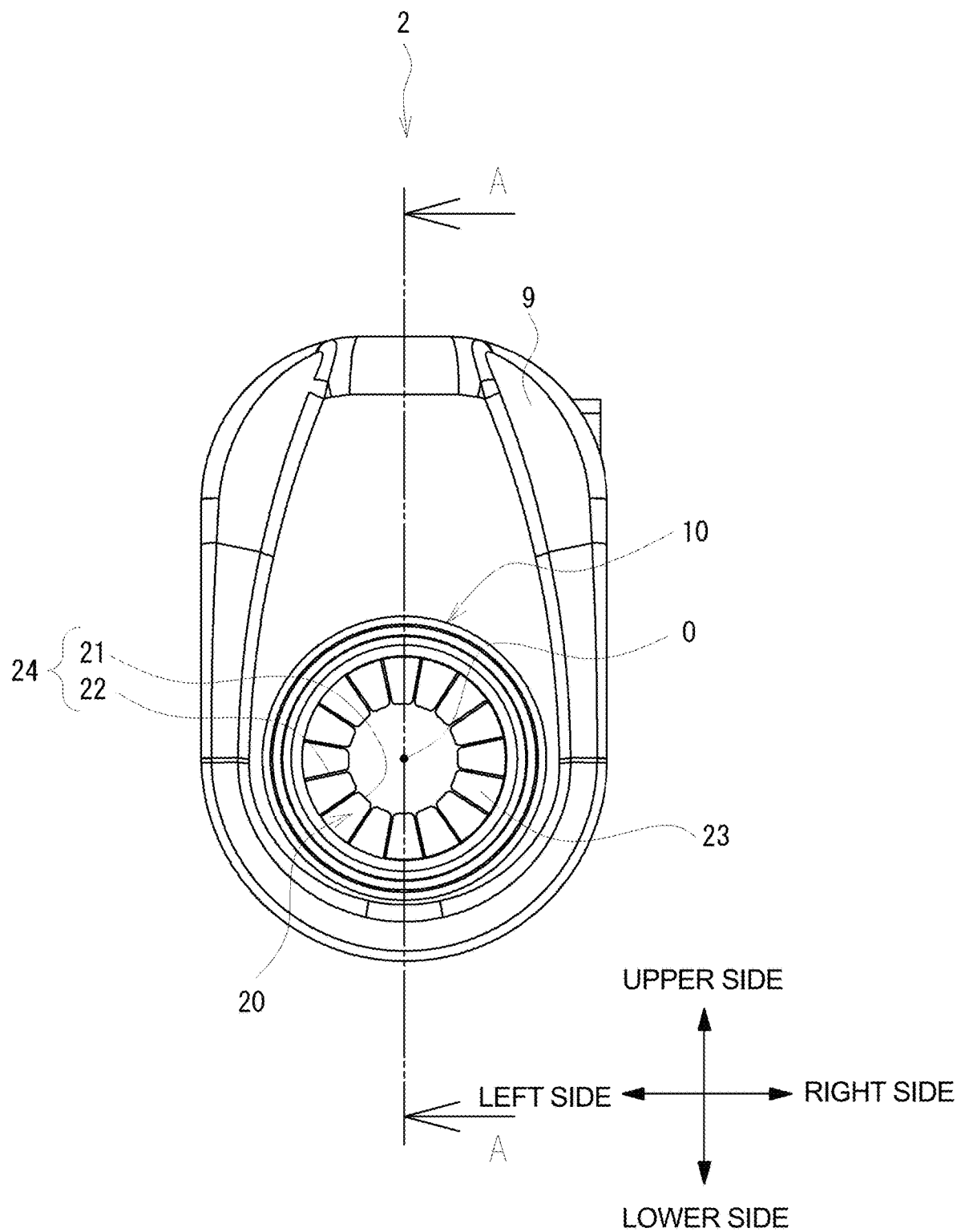
FIG. 3 is a front view (viewed in a direction along a virtual axis O) of the harvesting mechanism 2 with the cover member 11 (see FIG. 4) removed.

The harvesting mechanism 2 in this embodiment will be described with reference to FIGS. 2 to 5. In FIG. 2, the upper side of the paper refers to an upper side of the harvesting mechanism 2, the lower side refers to a lower side of the harvesting mechanism 2, the lower left side refers to a front side (a tip side) of the harvesting mechanism 2, the upper right side refers to a rear side (a rear end side) of the harvesting mechanism 2, the upper left side refers to a left side of the harvesting mechanism 2, and the lower right side refers to a right side of the harvesting mechanism. Accordingly, in the front view illustrated in FIG. 3, the upper side of the paper is the upper side of the harvesting mechanism 2, the lower side is the lower side of the harvesting mechanism 2, the left side is the left side of the harvesting mechanism 2, and the right side is the right side of the harvesting mechanism 2. In addition, in the cross-sectional view illustrated in FIG. 4, the upper side of the paper is the upper side of the harvesting mechanism 2, the lower side of the paper is the lower side of the harvesting mechanism 2, the left side of the paper is the front side (the tip side) of the harvesting mechanism 2, and the right side of the paper is the rear side (the rear end side) of the harvesting mechanism 2. In FIGS. 2 and 3, in order to clearly show the configuration of the harvesting mechanism 2, a cover member 11 (see FIG. 4), which will be described later, is not illustrated.

Figure 4:
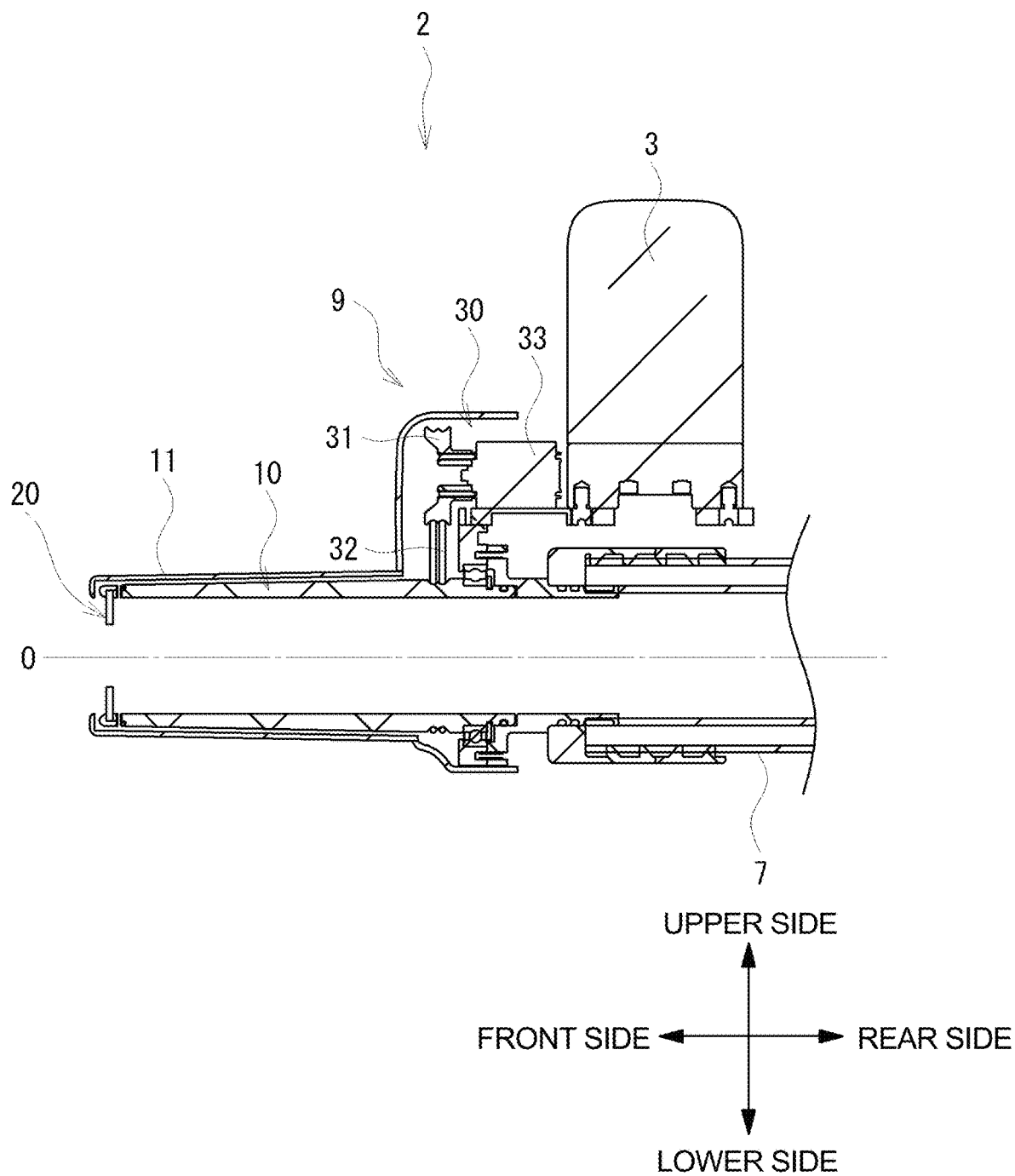
FIG. 4 is a cross-sectional view taken along A-A line in FIG. 3 with the cover member 11 being attached.

As shown in FIGS. 2 to 4, the harvesting mechanism 2 of the produce harvesting device 1 in this embodiment includes a base portion 9, a cylindrical member 10, a rotating member 20, and a rotation driving unit 30 (see FIG. 4). The base portion 9 holds the cylindrical member 10 and the rotation driving unit 30. In this embodiment, the base portion 9 is attached to an arm member 50 (see FIG. 1) of the robot arm 3, and the harvesting mechanism 2 is held by the arm member 50.

The cylindrical member 10 has a cylindrical shape. As an example, the cylindrical member 10 in this embodiment is formed in a substantially cylindrical shape. A guide passage is formed inside the cylindrical member 10 to allow fruits or vegetables to pass through the cylindrical member 10 from the front side to the rear side. As shown in FIG. 4, the guide passage inside the cylindrical member 10 is connected to one end of the hose 7 which serves as an air suction passage. As a result, the fruits or vegetables that have passed through the guide passage inside the cylindrical member 10 are guided to the hose 7.

The rotating member 20 radially extends from the tip end (i.e., the front side) of the cylindrical member 10 toward the inside of the guide passage. In other words, the rotating member 20 extends from the front side of the cylindrical member 10 in a direction for approaching a virtual axis O, which will be described later. In addition, the rotating member 20 may extend in a direction for approaching the virtual axis O from the inner circumferential surface of the cylindrical member 10 (for example, from the inner circumferential surface at a position slightly offset from the front end toward the rear side). The rotating member 20 has a through-hole member 24 (see FIGS. 2, 4, and 5) through which a fruit or vegetable passes from the front side to the rear side. The rotating member 20 will be described in detail later.

The rotation driving unit 30 (see FIG. 4) rotates at least the rotating member 20 about the virtual axis O that extends in a direction along the guide path of the cylindrical member 10. As an example, the rotation driving unit 30 in the present embodiment rotates the cylindrical member 10, to which the rotating member 20 is attached, about the virtual axis O, thereby rotating the rotating member 20. In detail, as shown in FIG. 4, the rotation driving unit 30 in the present embodiment includes a pulley 31, a belt 32, and a motor 33. The pulley 31 is held to be rotatable about an axis parallel to the virtual axis O which is the rotation center of the rotating member 20. The motor 33 rotates the pulley 31. The belt 32 is stretched between the pulley 31 and the cylindrical member 10. Therefore, when the pulley 31 is rotated by the driving force of the motor 33, the rotational force of the pulley 31 is transmitted to the cylindrical member 10 via the belt 32, and the cylindrical member 10 rotates about the virtual axis O. As a result, the rotating member 20 attached to the cylindrical member 10 also rotates about the virtual axis O.

However, the configuration for rotating the rotating member 20 may be changed. For example, a gear or the like may be used instead of the pulley 31 and the belt 32 so that the driving force of the motor 33 can be transmitted to the rotating member 20. Furthermore, the rotating member 20 may be formed separately from the cylindrical member 10. In this case, the rotation driving unit 30 only needs to have a mechanism for rotating at least the rotating member 20.

In this embodiment, the rotating member 20 comes into contact with a fruit or vegetable while being rotated by the rotation driving unit 30, thereby twisting the fruit or vegetable relative to its stem. Furthermore, the rotating member 20 can deform (or be bent) toward the rear side when a fruit or vegetable moving toward the rear side along the guide passage in the cylindrical member 10 comes into contact with the rotating member 20. When the rotating member 20 is deformed toward the rear side, the area of the through-hole member 24 increases in size when the rotating member 20 is viewed in the direction along the virtual axis O. Furthermore, when the fruit or vegetable that has come into contact with the rotating member 20 moves away from the rotating member 20, the shape of the rotating member 20 returns back to its original shape. When the shape of the rotating member 20 is restored, the area of the through-hole member 24 is reduced in size when the rotating member 20 is viewed in the direction along the virtual axis O and the area of the through-hole member 24 returns back to the original state before the fruit or vegetable is brought into contact with the rotating member 20.

As described above, when a fruit or vegetable (i.e., produce) does not come into contact with the rotating member 20, the through-hole member 24 formed in the rotating member 20 is in a downsized state, and therefore the suction pressure of air at the rotating member 24 is high as compared to the state where the area of the through-hole member 21 is enlarged. Therefore, a high suction pressure is applied to the fruit or vegetable towards the rear side. Accordingly, for example, when the fruit or vegetable has a size to pass through the reduced-size through-hole member 24 (i.e., a through hole 21 in the present embodiment, which will be described later), the fruit or vegetable may be plucked directly from its stem by the high suction pressure, pass through the through-hole member 24 to the rear side, and be guided into the hose. Furthermore, when a fruit or vegetable comes into contact with the rotating member 20 which is rotating, the fruit or vegetable is twisted relative to the stem due to a frictional force generated between the rotating member 20 and the fruit or vegetable. As a result, the fruit or vegetable is easier to pluck from the stem than if the fruit or vegetable was not twisted relative to the stem. Furthermore, when a fruit or vegetable comes into contact with the rotating member 20, the rotating member 20 temporarily deforms toward the rear side, expanding the area of the through-hole member 24, so that the fruit or vegetable passes smoothly through the through-hole member 24 toward the rear side. After the fruit or vegetable has passed through the through-hole member 24, the through-hole member 24 is reduced in size by the restoring force of the rotating member 20, so that the suction pressure at the through-hole member 24 increases again. Therefore, the produce harvesting device 1 in the present embodiment can efficiently harvest multiple fruits or vegetables while preventing the fruits or vegetables from getting damaged, deformed, and the like.

The rotating member 20 in the present embodiment is made of at least one of silicone and rubber, which have flexibility and shape restoring characteristics. Therefore, even if the fruit or vegetable comes into contact with the rotating member 20, the fruit or vegetable is less likely to be damaged or deformed by the rotating member 20. In addition, when a fruit or vegetable comes into contact with the rotating member 20 while rotating, the frictional force generated between the rotating member 20 and the fruit or vegetable causes the fruit or vegetable to be appropriately twisted relative to the stem, making it easier to pluck the fruit or vegetable from the stem. Furthermore, when the fruit or vegetable is separated away from the rotating member 20, the shape of the rotating member 20 is properly restored, and the area of the through-hole member 24 is automatically reduced again. Accordingly, the fruits or vegetables can be harvested appropriately.

In this embodiment, the rotating member 20 is made of silicon. Even if silicon is taken into the human body, the silicon is less likely to have any adverse effects on the body. Therefore, the safety of the harvested fruits or vegetables can be more easily guaranteed.

Figure 5:
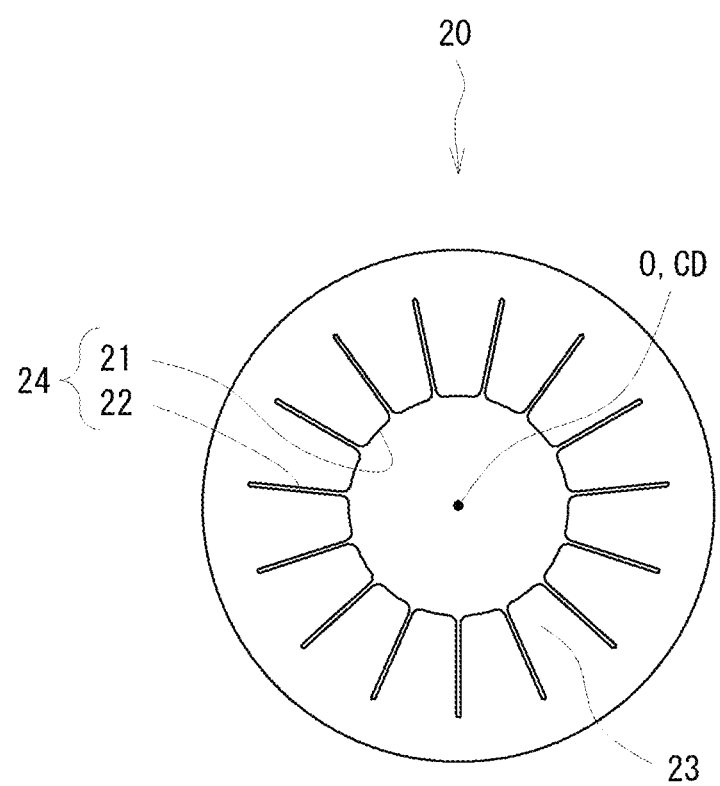
FIG. 5 is a front view of a rotating member 20 (as viewed in a direction along the virtual axis O).

FIG. 5 is a view (a front view) of the rotating member 20 in this embodiment as viewed from the front side (i.e., viewed in a direction along the virtual axis O). As shown in FIG. 5, the rotating member 20 in this embodiment has three or more cuts 22 each extending radially outward from the center when viewed in the direction along the virtual axis O, thereby forming at least a portion of the through-hole member 24. In addition, in the rotating member 20 in this embodiment, the through hole 21 is defined in a central portion of the area of the rotating member 20 viewed in the direction along the virtual axis O to pass through the rotating member 20 from the front side to the rear side (i.e., in a front-rear direction). The through hole 21 is a hole that passes through the rotating member 20 in the front-rear direction even when the area of the through portion 24 is reduced to a minimum size. The inner end of each of the three or more cuts 22 is connected to the through hole 21. As a result, a plurality of movable pieces 23 that are movable in the front-rear direction are circumferentially arranged in the rotating member 20 to surround the through hole 21. In this embodiment, the movable pieces 23 are circumferentially arranged around the through hole 21 in the rotating member 20. Each of the movable pieces 23 has flexibility and shape restoration property. Therefore, when a fruit or vegetable comes into contact with the movable pieces 23 of the rotating member 20, the fruit or vegetable is twisted relative to the stem due to the frictional force generated between the movable pieces 23 and the fruit or vegetable. Furthermore, the movable pieces 23 are deformed toward the rear side, and the area of the through portion 24 is enlarged, so that the fruit or vegetable can pass through the through hole 21 to the rear side appropriately. Furthermore, when the fruit or vegetable is separated from the movable pieces 23, the shape of each movable piece 23 is properly restored and the size of the through-hole member 24 is reduced again. Accordingly, the fruits or vegetables can be harvested appropriately.

In this embodiment, when the rotating member 20 is viewed in the direction along the virtual axis O, the center CD of gravity of the area of the through hole 21 to which the inner ends of the three or more cuts 22 are connected (in this embodiment, the center of the through hole 21) matches the virtual axis O. However, the center CD of gravity of the through hole may be spaced apart (i.e., offset) from the virtual axis O, as will be described in detail later.

In this embodiment and in the modified example which will be described below, each of the three or more cuts formed in the rotating member has a linear shape. However, the shape of the cut when the rotating member is viewed in the direction along the virtual axis O may be curved or the like.

As shown in FIG. 4, the harvesting mechanism 2 in this embodiment further includes a cover member 11 that surrounds and covers at least the rotating member 20. In detail, the cover member 11 in this embodiment circumferentially surrounds and covers the members rotated by the rotation driving unit 30 (i.e., the cylindrical member 10 and the rotating member 20 provided on the cylindrical member 10). Therefore, branches, leaves, etc. of fruits or vegetables are less likely to come into contact with the rotating member. This reduces the possibility of unnecessarily damaging branches, leaves, etc., and the possibility of moving the target fruit or vegetable by the rotation of the rotating member.

Hose

The configuration of the hose 7 in this embodiment will be described with reference to FIG. 6. The hose 7 in this embodiment is flexible. Therefore, even if the harvesting mechanism 2 to which the tip of the hose 7 is connected is moved, the tip of the hose 7 follows the movement of the harvesting mechanism 2. Therefore, the fruits or vegetables taken in by the harvesting mechanism 2 are properly harvested through the hose 7.

Figure 6:
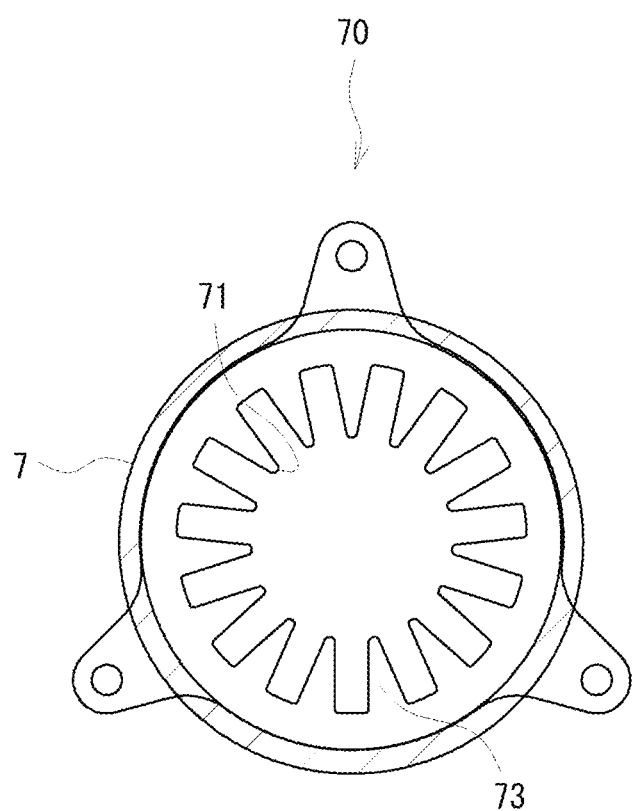
FIG. 6 is a cross-sectional view of a hose 7 taken along a cross-section intersecting a passage of the hose.

As shown in FIG. 6, a speed reducer 70 is provided inside the hose 7 in this embodiment. The speed reducer 70 extends inward from the inner circumferential surface of the hose 7 without blocking or closing the inner path in the hose 7. The speed reducer 70 comes into contact with the fruit or vegetable passing through the hose 7, thereby reducing the passing speed of the fruit or vegetable through the hose 7. As a result, the possibility of damage, deformation, etc. occurring to the fruits or vegetables passing through the hose 7 can be reduced. Furthermore, since the speed reducer 70 does not block the path within the hose 7, the speed reducer 70 also prevents the suction pressure of air in the cylindrical member 10 from being reduced. Accordingly, the fruits or vegetables can be harvested appropriately.

The speed reducer 70 in this embodiment is made of flexible material (e.g., silicon in this embodiment). Therefore, even if the fruit or vegetable comes into contact with the speed reducer 70, the fruit or vegetable is less likely to be damaged or deformed. Furthermore, even if silicon is taken into the human body, the silicon is less likely to have any adverse effects on the body. Therefore, the safety of the harvested fruits or vegetables can be more easily guaranteed.

As shown in FIG. 6, the speed reducer 70 in the present embodiment has a substantially annular shape extending inward from the inner circumferential surface of the hose 7. Since a through hole 71 is defined by the speed reducer 70, the path inside the hose 7 is not blocked or closed by the speed reducer 70. A plurality of movable pieces 73 are circumferentially arranged around the through hole 71 in the speed reducer 70. Therefore, the speed of the fruits or vegetables passing through the hose 7 is appropriately reduced by the movable pieces 73, and the movable pieces 73 are less likely to cause damage to the fruits or vegetables. Furthermore, a space is formed between the radially adjacent movable pieces 73. Therefore, although the speed reducer 70 is provided, the suction pressure at the through hole 71 is less likely to increase. Therefore, an increase in the passing speed of the fruits or vegetables around the through holes 71 can be suppressed. However, the configuration of the speed reducer 70 may be changed. For example, the speed reducer may be a fabric or the like that is disposed in the inside of the hose 7. In this case, the speed of the fruits and vegetables can be appropriately reduced with a simple structure.

Robot Arm

One example of the robot arm 3 will be described with reference to FIG. 1. As described above, the robot arm 3 holds and moves the harvesting mechanism 2. As an example, the robot arm 3 in this embodiment includes an arm member 50 having a plurality of joints. The harvesting mechanism 2 is held by the arm member 50. By driving the arm member 50 via the joints, the robot arm 3 can move the position of the harvesting mechanism 2 held by the arm member 50 and can also change the direction of the harvesting mechanism 2 (i.e., the direction in which the rotating member 20 provided on the cylindrical member 10 faces). However, it is also possible to use an arm member that is driven by a mechanism other than the joints.

The arm member 50 is fixed to the base 4. The base 4 is provided with an arm moving unit 41 that moves the arm member 50 in a direction parallel to the installation surface of the base 4 on which the arm member 50 is installed. When the arm moving unit 41 is driven, the entire arm member 50 moves on the installation surface. The configuration of the arm moving unit 41 can be selected appropriately. For example, the arm moving unit 41 may include wheels and a motor for rotating the wheels. Also, a belt conveyor or the like may serve as the arm moving unit.

Control Unit

The control unit 6 controls the produce harvesting device 1. As an example, the control unit 6 in this embodiment is a personal computer (hereinafter, referred to as a "PC"). However, a device other than a PC (for example, at least one of a server, a tablet terminal, a smartphone, etc.) may be used as the control unit 6. In addition, control units of a plurality of devices may cooperate to serve as the control unit that controls the produce harvesting device 1.

The control unit 6 includes a CPU (controller) that performs various control processes, and a storage device (NVM). The control unit 6 is connected to the robot arm 3 and the imaging unit 5, etc. via at least one of wired communication, wireless communication, a network, etc. The control unit 6 is also connected to an operation unit and a display unit. The operation unit is operated by an operator (such as a user or a worker) to input various instructions. The operation unit may be, for example, at least one of a keyboard, a mouse, a touch panel, and the like. The display unit displays various images. In addition, an operation unit and a display unit integrally provided in the control unit may be used instead of using the operation unit and the display unit externally connected to the control unit 6.

The control unit 6 recognizes the position of a fruit or vegetable as a harvesting target based on images captured by the imaging unit 5. The control unit 6 controls the driving of the robot arm 3 based on the recognized position of the target fruit or vegetable, thereby moving the harvesting mechanism 2 (more specifically, the rotating member 20 of the harvesting mechanism 2) to the recognized position of the target fruit or vegetable. That is, since the harvesting mechanism 2 automatically moves to the position of the target fruit or vegetable, the worker does not need to move the position of the harvesting mechanism 2 himself/herself. Therefore, fruits or vegetables can be harvested while avoiding in increasing the burden on the worker.

The imaging unit 5 in this embodiment is a three-dimensional camera capable of measuring the distance to an object. The control unit 6 acquires the distance between a fruit or vegetable as a harvesting target and the three-dimensional camera, which is measured by the three-dimensional camera. The control unit 6 can appropriately recognize the position of the target fruit or vegetable based on the acquired distance.

Moreover, the imaging unit 5 in this embodiment may capture color images. Based on the color images captured by the imaging unit 5, the control unit 6 identifies the target fruit or vegetable from among one or more fruits or vegetables appearing in the color image. Therefore, even if a plurality of fruits or vegetables are captured in a color image, the target fruit or vegetable can be appropriately identified based on the color image.

In this embodiment, a mathematical model may be used. The mathematical model has been trained by a machine learning algorithm to output an identified result of the target fruit or vegetable when an image (in the present embodiment, a color image) is input into the mathematical model. For example, the mathematical model is trained to output an identified fruit or vegetable as a harvesting target from among one or more of fruits or vegetables appearing in the color image. The control unit 6 acquires the identified result output by the mathematical model by inputting the image captured by the imaging unit 5 into the mathematical model. Therefore, the target fruit or vegetable can be identified with higher accuracy.

As shown in FIG. 5, in this embodiment, the inner ends of the three or more cuts 22 formed in the rotating member 20 are connected to the through hole 21. When the rotating member 20 is viewed in a direction along the virtual axis O, the center CD of gravity of the through hole 21 matches (in other words, is aligned with) the virtual axis O. In this embodiment, when the control unit 6 controls the robot arm 3 to move the position of the rotating member 20 to a recognized fruit or vegetable, the control unit 6 moves a particular position of the rotating member 20 that is away from the virtual axis O and the center CD of gravity (in this embodiment, a position that is away from the virtual axis O and the center CD of gravity by a distance equal to or greater than the radius of the through hole 21) to the position of the fruit or vegetable. In other words, the control unit 6 aligns the particular position of the rotating member 20, which is offset from the virtual axis O and the center CD, with the target fruit or vegetable. In this case, the fruit or vegetable will be likely to come into contact with the rotating member 20 (more specifically, the movable pieces 23 of the rotating member 20), and thus the fruit or vegetable will be likely to be twisted relative to its stem. This makes it easier to harvest fruits and vegetables more appropriately.

Modification

The configurations and operations described in the above embodiments are merely one example. Therefore, it is possible to change the configurations and operations exemplified in the above embodiment. Hereinafter, a modification to the above-described embodiment will be described. The following description of the modified examples will focus on the configuration and operation that are different from the above-described embodiment. The configurations, operations, etc., for which description is omitted in the following modified examples, can be similar to those of the above-described embodiment.

First Modification

Figure 7:
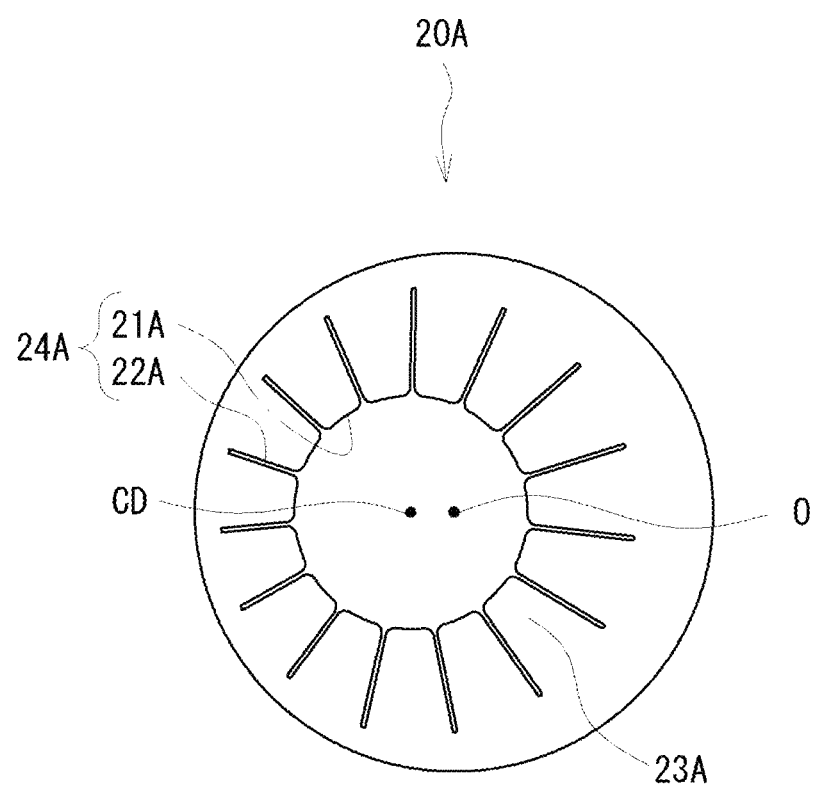
FIG. 7 is a front view of a rotating member 20A according to a first modified example (as viewed in a direction along a virtual axis O).

A first modified example will be described with reference to FIG. 7. As shown in FIG. 7, a rotating member 20A in the first modified example is provided with a circular through hole 21A and three or more cuts 22A, similar to the above-described embodiment. The through hole 21A and the cuts 22A form a through-hole member 24A that allows a fruit or vegetable to pass through from the front side to the rear side. The inner ends of the three or more cuts 22A are connected to the through hole 21A. As a result, a plurality of movable pieces 23A are circumferentially arranged in an annular shape around the through hole 21A. Here, when the rotating member 20A in the first modified example is viewed in a direction along a virtual axis O, the center CD of gravity of the through hole 21A (in the example shown in FIG. 7, the center of the through hole 21) is offset from the virtual axis O.

In this case, a fruit or vegetable that reaches the rotating member 20A near the virtual axis O is likely to come into contact with the rotating member 20A (more specifically, the movable pieces 23A formed on the rotating member 20A). In addition, since the rotating member 20A is rotated by a rotation driving unit 30, a fruit or vegetable that reaches the rotating member 20A at a position away from the virtual axis O is also likely to come into contact with the rotating member 20A (more specifically, the movable pieces 23A). As a result, the fruit or vegetable is likely to be twisted about the stem. Accordingly, the fruits or vegetables can be harvested appropriately. In the first modified example, when the control unit 6 controls the robot arm 3 to move the rotating member 20 to the position of the recognized fruit or vegetable, the control unit 6 may move a particular position of the rotating member 20 at which the virtual axis O passes to the position of the fruit or vegetable. In other words, the rotating member 20 is moved such that the virtual axis is aligned with the target fruit or vegetable. As a result, the problem that fruits and vegetables are not taken into the passage of the cylindrical member 10 is less likely to occur. This makes it easier to harvest multiple fruits and vegetables stably.

Second Modification

Figure 8:
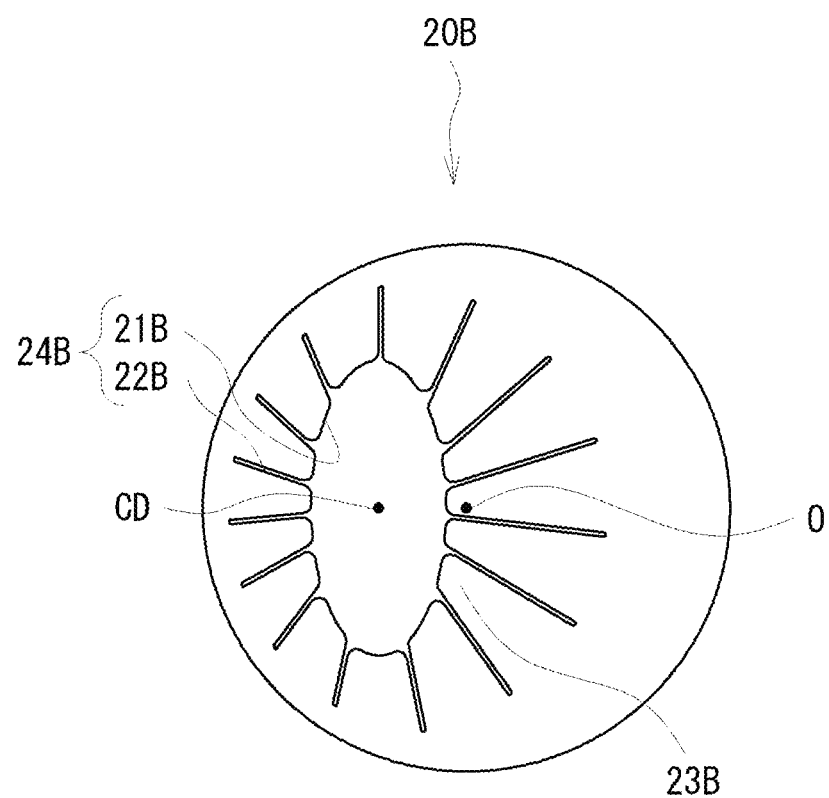
FIG. 8 is a front view of a rotating member 20B according to a second modified example (as viewed in a direction along a virtual axis O).

A second modified example will be described with reference to FIG. 8. Of the configuration and operation of the produce harvesting device in the second modified example, the configuration and operation in the first modified example can be adopted for the configuration and operation other than the shape of the through hole 21B of the rotating member 20B. As shown in FIG. 8, a rotating member 20B in the second modified example is provided with a through hole 21B and three or more cuts 22B, similar to the first modified example. The through hole 21B and the cuts 22B form a through-hole member 24A that allows a fruit or vegetable to pass through from the front side to the rear side. The center CD of gravity of the through hole 21B is spaced apart from the virtual axis O. When the rotating member 20B in the second modified example is viewed in a direction along the virtual axis O, the shape of the through hole 21B is formed to have an elliptical shape, unlike the first modified example. In the second modified example, the force applied to a fruit or vegetable from the rotating member 20B (e.g., the movable pieces 23B, etc.) is more likely to change than when the through hole when viewed in the direction along the virtual axis O has a circular shape. As a result, the fruit or vegetable is more easily twisted about the stem. Accordingly, the fruits or vegetables can be harvested appropriately.

Third Modification

Figure 9:
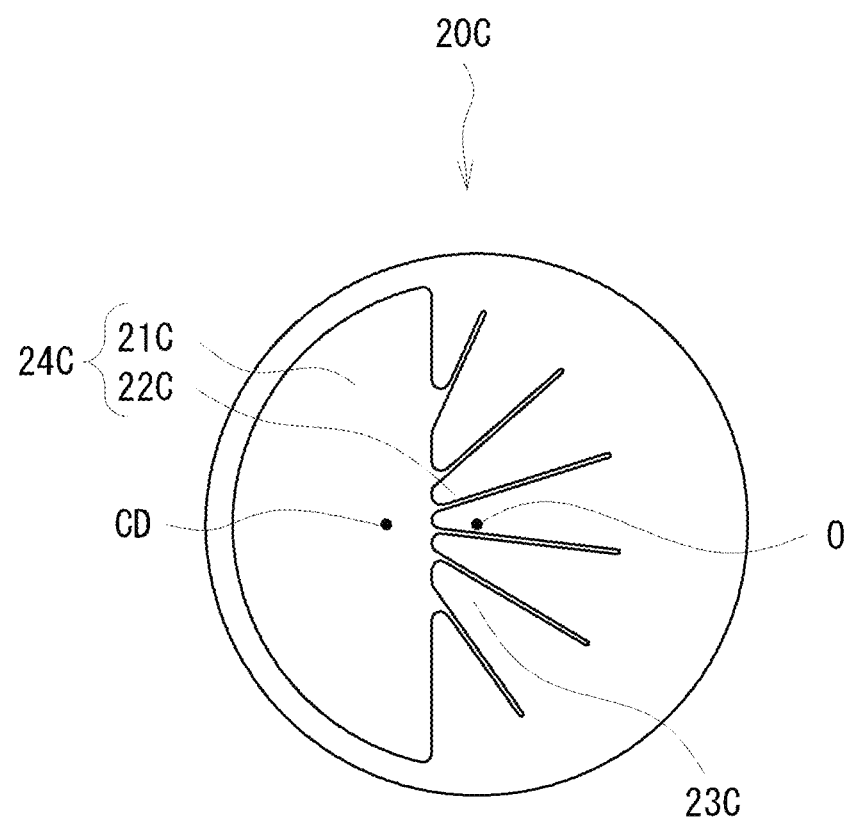
FIG. 9 is a front view of a rotating member 20C according to a third modified example (as viewed in a direction along a virtual axis O).

A third modified example will be described with reference to FIG. 9. Of the configuration and operation of the fruit harvesting device in the third modified example, the configuration and operation in the second modified example can be adopted for the configuration and operation other than the shape of the through hole 21C of the rotating member 20C. As shown in FIG. 9, a rotating member 20C in the third modified example is provided with a through hole 21C and three or more cuts 22C, similar to the second modified example. The through hole 21C and the cuts 22C form a through-hole member 24C that allows a fruit or vegetable to move from the front side to the rear side. The center CD of gravity of the through hole 21C is spaced apart from the virtual axis O. When the rotating member 20C in the third modified example is viewed in a direction along the virtual axis O, the shape of the through hole 21C is formed to have a substantially semi-circular shape, unlike the first and second modified examples. That is, in the third modified example as well, the shape of the through hole 21C is a shape other than a circle. In this case as well, the force applied to a fruit or vegetable from the rotating member 20C (for example, the movable pieces 23C, etc.) is likely to change. As a result, the fruit or vegetable is more easily twisted about the stem. Furthermore, in the rotating member 20C in the third modified example, the cuts 22C do not entirely extend from the inner side in the entire circumferential direction, but extend partially circumferentially in the circumferential direction. In this case, fruits and vegetables are still harvested properly.

In addition, the shape of the through hole when the rotating member is viewed in the direction along the virtual axis O can also be polygonal. In this case, as in the second and third modified examples, the force applied from the rotating member to a fruit or vegetable is likely to change.

Fourth Modification

Figure 10:
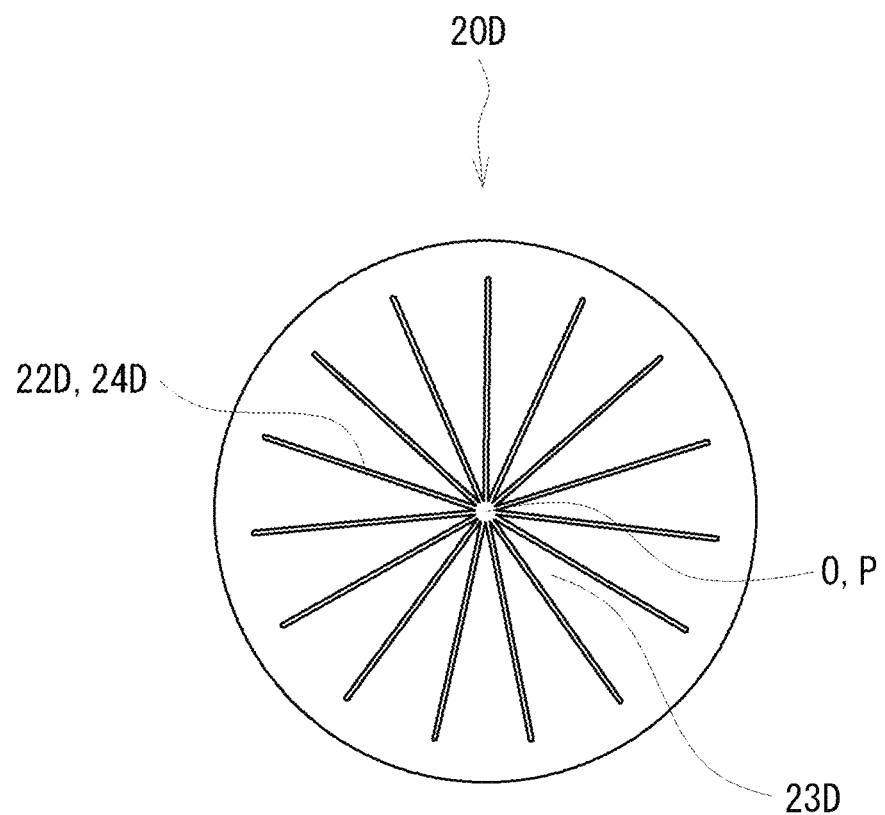
FIG. 10 is a front view of a rotating member 20D according to a fourth modified example (as viewed in a direction along a virtual axis O).

A fourth modified example will be described with reference to FIG. 10. A rotating member 20D in the fourth modified example is provided with a plurality of cuts 22D extending radially outward from the center. Here, the inner ends of the multiple cuts 22D in the fourth modified example are connected to a common connection point P, not to the through hole. In other words, in the fourth modified example, when the rotating member 20D is viewed in a direction along the virtual axis O, the rotating member 20D is formed so that when the area of the multiple cuts 22D that form the through-hole 24D is reduced, the hole that passes through the rotating member 20D in the front-rear direction is substantially blocked (closed). Even in this case, when a fruit or vegetable comes into contact with movable pieces 23D of the rotating member 20D, the fruit or vegetable is twisted relative to the stem and the movable pieces 23D deforms toward the rear side, allowing the fruit or vegetable to pass through appropriately toward the rear side. In addition, in the rotating member 20D in the fourth modified example, the connection point P of the cuts 22D coincides (i.e., is aligned) with the virtual axis O. However, it is also possible to shift the connection point P from the virtual axis O.

The technology disclosed in the above embodiments is only one example. Therefore, the techniques illustrated in the above embodiments can be modified. For example, it is possible to implement only a part of the techniques exemplified in the above embodiments. Specifically, in the above embodiment, the robot arm 3 moves the harvesting mechanism 2 to a position near the fruit or vegetable. However, the configuration for moving the harvesting mechanism 2 can also be changed. For example, a worker himself may move the harvesting mechanism 2 to a position close to the fruit or vegetable. In other words, the harvesting mechanism 2 and the like excluding the robot arm 3 may be used as a produce harvesting device. In addition, it is also possible to use other configurations in addition to at least a part of the configurations exemplified in the above embodiments.

The invention claimed is:
1. A produce harvesting device, comprising:
a cylindrical member that defines a guide passage therein through which a tomato passes toward a rear side, the cylindrical member guiding the tomato toward a hose that is connected to the cylindrical member and defines a suction passage therein for air that is in communication with the guide passage;
a rotating member that radially extends from an inner circumferential surface or a front side of the cylindrical member into the guide passage and forms a through-hole member that allows the tomato to pass through from the front side to the rear side; and
a rotation driving unit that is configured to drive the rotating member to rotate about a virtual axis that extends in a direction along the guide passage, wherein
the rotating member is configured to:
when the rotating member comes into contact with the tomato while rotating, twist the tomato relative to a stem of the tomato;
when the rotating member comes into contact with the tomato moving toward the rear side, deform toward the rear side to increase the through-hole member in size when the rotating member is viewed in a direction along the virtual axis; and
reduce the through-hole member in size by returning back to an original shape of the rotating member, wherein
the rotating member includes a plurality of movable pieces and three or more slits between the plurality of movable pieces, the three or more slits each extending radially outward from a center of the rotating member to form at least a portion of the through-hole member, and inner ends of the three or more slits are connected to a single connecting point or to a single through hole that passes through the rotating member from the front side to the rear side.

2. The produce harvesting device according to claim 1, wherein the rotating member is made of at least one of silicone and rubber having flexibility and shape restoring characteristics.

3. The produce harvesting device according to claim 1, wherein when the rotating member is viewed in the direction along the virtual axis, the single connecting point to which the inner ends of the three or more slits are connected or a center of gravity of the through hole is offset from the virtual axis.

4. The produce harvesting device according to claim 1, wherein the inner ends of the three or more slits are connected to the single through hole that passes through the rotating member from the front side to the rear side, and when the rotating member is viewed in the direction along the virtual axis, the through hole is formed in an elliptical or polygonal shape.

5. The produce harvesting device according to claim 1, further comprising a cover member that is configured to circumferentially surround and cover the rotating member.

6. The produce harvesting device according to claim 1, further comprising the hose; and a speed reducer that is disposed inside the hose without closing the hose, wherein the speed reducer is configured to reduce a passing speed of the tomato in the hose when the tomato passing through the hose comes into contact with the speed reducer.

7. The produce harvesting device according to claim 1, further comprising a robot arm that has an arm member holding a harvesting mechanism including the cylindrical member and the rotating member, the robot arm moving the arm member together with the harvesting mechanism;

an imaging unit that is configured to capture an image; and a control unit that is configured to control the produce harvesting device, wherein the control unit is further configured to:

recognize a position of a target tomato based on the image captured by the imaging unit; and move the harvesting mechanism to the position of the recognized target tomato by controlling the robot arm based on the position of the recognized target tomato.

8. The produce harvesting device according to claim 7, wherein the imaging unit includes a three-dimensional camera that is configured to measure a distance to an object.

9. The produce harvesting device according to claim 7, wherein the imaging unit is configured to capture a color image, and the control unit is further configured to identify the target tomato from among one or more tomatoes appearing in the color image captured by the imaging unit.

10. The produce harvesting device according to claim 1, wherein the plurality of movable pieces are circumferentially arranged around the through hole, a first movable piece and a second movable piece of the plurality of movable pieces contact each other in the original shape of the rotating member.

11. The produce harvesting device according to claim 10, wherein the first movable piece and the second movable piece separate when the rotating member is deformed.

12. The produce harvesting device according to claim 1, wherein a first slit and a second slit of the three or more slits having different lengths.

\* \* \* \* \*